US012784240B2

(12) United States Patent
Zhang

(10) Patent No.: US 12,784,240 B2
(45) Date of Patent: Nov. 3, 2026

(54) METHOD AND NON-TRANSITORY MEDIUM FOR 3D SKELETONS

(71) Applicant: Hinge Health, Inc., San Francisco, CA (US)

(72) Inventor: Wenxin Zhang, Montreal (CA)

(73) Assignee: Hinge Health, Inc., San Francisco, CA (US)

( * ) Notice: Subject to any disclaimer, the term of this patent is extended or adjusted under 35 U.S.C. 154(b) by 421 days.

(21) Appl. No.: 18/299,880

(22) Filed: Apr. 13, 2023

(65) Prior Publication Data

US 2023/0252676 A1 Aug. 10, 2023

Related U.S. Application Data

(63) Continuation of application No. 17/906,851, filed as application No. PCT/IB2020/052609 on Mar. 20, 2020, now Pat. No. 12,008,772.

(51) Int. Cl.
*G06T 7/246* (2017.01)
*G06T 7/292* (2017.01)
(Continued)

(52) U.S. Cl.
CPC .............. *G06T 7/251* (2017.01); *G06T 7/292* (2017.01); *G06T 7/75* (2017.01); *G06V 20/52* (2022.01);
(Continued)

(58) Field of Classification Search
CPC . G06T 2207/10016; G06T 2207/30196; G06T 2207/30244; G06T 7/251;
(Continued)

(56) References Cited

U.S. PATENT DOCUMENTS 11,030,442 B1 * 6/2021 Bergamo .............. G06F 18/214
11,232,294 B1 * 1/2022 Banerjee ................ G06T 7/246
(Continued)

FOREIGN PATENT DOCUMENTS

CN 109829972 B 6/2023
GB 2573170 A 10/2019
JP 2019102877 A 6/2019

OTHER PUBLICATIONS

Dong et al., "Fast and Robust Multi-Person 3D Pose Estimation from Multiple Views," 2019 IEEE/CVF Conference on Computer Vision and Pattern Recognition (Year: 2019).*
(Continued)

*Primary Examiner* — Kenny A Cese
(74) *Attorney, Agent, or Firm* — Ashurst Perkins Coie US LLP; Andrew T. Pettit

(57) ABSTRACT

This disclosure is directed to a method and system for matching human pose data in the form of 2D skeletons for the purposes of 3D reconstruction. The system may comprise a scoring module that assigns an affinity score to each pair of cross-view 2D skeletons, a matching module that assigns optimal pairwise matches based on the affinity scores, a grouping module that assigns each 2D skeleton to a group such that each group corresponds to a unique person, based on the pairwise matches; and a temporal consistency module that assigns each group an ID that maintains correspondence to the same person over the multi-video sequence.

17 Claims, 4 Drawing Sheets

60

| | a1 | a2 | a3 |
|---|---|---|---|
| b1 | 250 | 20 | 15 |
| b2 | 21 | 14 | 195 |
| b3 | 13 | 201 | 30 |

70

(51) Int. Cl.
*G06T 7/73* (2017.01)
*G06V 20/52* (2022.01)
*G06V 30/19* (2022.01)
*G06V 40/10* (2022.01)

(52) U.S. Cl.
CPC .... *G06V 30/1904* (2022.01); *G06V 30/19067* (2022.01); *G06V 40/10* (2022.01); *G06V 40/103* (2022.01); *G06T 2207/10016* (2013.01); *G06T 2207/30196* (2013.01); *G06T 2207/30244* (2013.01)

(58) Field of Classification Search
CPC .. G06T 7/292; G06T 7/55; G06T 7/75; G06V 20/52; G06V 2201/033; G06V 30/1904; G06V 30/19067; G06V 40/10; G06V 40/103
See application file for complete search history.

(56) References Cited

U.S. PATENT DOCUMENTS

| | | | | |
|---|---|---|---|---|
| 2019/0109975 | A1 | 4/2019 | Linderoth et al. | |
| 2019/0266780 | A1* | 8/2019 | Le Floch | G06T 15/04 |
| 2020/0097732 | A1* | 3/2020 | Doolittle | G06V 40/23 |

OTHER PUBLICATIONS

Sun, et al., “People tracking in an environment with multiple depth cameras: A skeleton-based pairwise trajectory matching scheme”, Journal of Visual Communication and Image Representation, vol. 35, Feb. 2016, pp. 36-54.
Pages, R., et al., “Affordable content creation for free-viewpoint video and VR/AR applications”, Journal of Visual Communications and Image Representation, vol. 53, XP055821564, Mar. 2018, pp. 192-201.
Shaban, Muhammad, et al., “An information fusion framework for person localization via body pose in spectator crowds”, Information Fusion, vol. 51, XP085685649, Nov. 2018, pp. 178-188.
Chang, et al., “3D Skeleton Construction by Multi-View 2D Images and 3D Model Segmentation”, 2011 Fourth International Conference on Ubi-Media Computing, [online] [retrieved on Dec. 4, 2020 (Dec. 4, 2020)]. Retrieved from the Internet: <https://ieeexplore.ieee.org/stamp/stamp.jsp?tp=&arnumber=5992065>, Aug. 18, 2011, pp. 169-173.
Wang, et al., “Human Skeleton Tracking Using Information Weighted Consensus Filter in Distributed Camera Networks”, 2017 Chinese Automation Congress (CAC), [online] [retrieved on Dec. 4, 2020 (Dec. 4, 2020)]. Retrieved from the Internet: <https://ieeexplore.ieee.org/stamp/stamp.jsp?tp=&arnumber=8243598>, Jan. 1, 2018, pp. 4640-4644.

* cited by examiner

60

| | a1 | a2 | a3 |
|---|---|---|---|
| b1 | 250 | 20 | 15 |
| b2 | 21 | 14 | 195 |
| b3 | 13 | 201 | 30 |

70

METHOD AND NON-TRANSITORY MEDIUM FOR 3D SKELETONS

CROSS-REFERENCE TO RELATED APPLICATIONS

This application is a continuation of U.S. patent application Ser. No. 17/906,851, filed on Sep. 20, 2022, and titled "Method and System for Matching 2D Human Poses from Multiple Views," which is a national stage entry of International Patent Application No. PCT/IB2020/052609, filed on Mar. 20, 2020, and titled "Method and System for Matching 2D Human Poses from Multiple Views," which are incorporated by reference herein in their entirety.

FIELD

This disclosure relates to identifying and tracking 2D joint skeletons in video segments. More particularly, this disclosure relates to matching 2D skeletal data corresponding to the same person where the 2D data is extracted from frames of video segments taken from multiple viewpoints.

BACKGROUND

Reconstruction of 3D human poses from synchronized 2D video sequences may be accomplished in two stages. The first stage, 2D human pose estimation, detects keypoints in each frame of each video sequence. The second stage fuses the 2D keypoints, along with the camera calibration parameters, into 3D skeletons.

2D human pose estimators may rely on deep neural networks to detect keypoints, which may correspond to anatomical joints, in each video frame of a video sequence. A group of keypoints belonging to a single person may be connected to form a 2D skeleton. For scenes containing multiple persons, multiple 2D skeletons may be detected in each frame, and each is assigned an index or unique ID. Multi-person pose estimation may be accomplished by performing keypoint detection on multiple regions of interest, or it may be accomplished by detecting all keypoints in a single image frame jointly in "one shot" and then grouping them into individual 2D skeletons.

For each person in the scene, 2D skeletons that correspond to the specific person are grouped together and the 3D skeleton is estimated through a data fusion technique. For instance, each 3D joint position may be independently estimated by triangulation of 2 or more keypoints. Alternatively, 3D joint positions may be estimated by Kalman Filters that model the motion of the joints over time.

For scenes containing multiple persons, it may be important that 2D skeletons be grouped such that each group corresponds to a single person. Because the 2D skeletons in each view may be extracted independently, their indices or IDs are not correlated across views. Accordingly, a matching step is typically used to identify the 2D groups that get fused in order to recover the 3D skeletons.

SUMMARY

This disclosure relates in an aspect to a method of identifying humans between two or more camera views from 2d skeletons of the humans of each view. The method includes for each skeleton in each of the two or more camera views, performing a pairwise scoring with each of the skeletons in another of the two or more camera views and assign an affinity score to each pair. The method also includes identifying a best match of a skeleton in a first camera view to a skeleton in a second camera view by maximizing the affinity score of the pair. The method includes grouping skeletons by identifying a set of skeletons in a first camera view, the set relating to the humans in the first camera view, with a set of skeletons in a second camera view using the best match.

In an aspect, this disclosure relates to a motion capture system for two or more humans comprising two or more calibrated cameras generating synchronized video streams, each camera having an overlapping field of views that include the two or more humans. The system has a 2D pose estimator module associated with each of the two or more calibrated cameras for generating a 2D skeletons for each human in the field of view of the camera for a frame of the video stream and a scoring module for perform a pairwise scoring for each of the 2D skeletons associated with a first camera with each 2D skeleton of another of the two or more cameras and assigning an affinity score to each pair. The system also has a matching module that matches a 2D skeleton in a first camera view to a 2D skeleton in a second camera view by maximizing the affinity score of the pair and a grouping module that groups 2D skeletons by identifying a set of 2D skeletons for each person, respectively, in the captured scene such that each 2D skeleton in a group corresponds to a view of the respective person in a given camera view. The system also includes a temporal matching module that assigns an identifier to each 2D skeleton group that remains consistent across a sequence of frames of the video streams and a 3D reconstruction module that combines the grouped 2D skeleton across a sequence of frames for a human to create a 3D skeleton of the human, capturing the position of the human.

BRIEF DESCRIPTION OF THE DRAWINGS

In drawings which illustrate by way of example only an embodiment of the disclosure.

DETAILED DESCRIPTION

This disclosure is directed to a method and system for matching human pose data in the form of 2D skeletons for the purposes of 3D reconstruction. The system may comprise a scoring module 20 that assigns an affinity score to each pair of cross-view 2D skeletons, a matching module 30 that assigns optimal pairwise matches based on the affinity scores, a grouping module 50 that assigns each 2D skeleton to a group such that each group corresponds to a unique person, based on the pairwise matches; and a temporal consistency module 60 that assigns each group an ID that maintains correspondence to the same person over the multi-video sequence.

Figure 1:
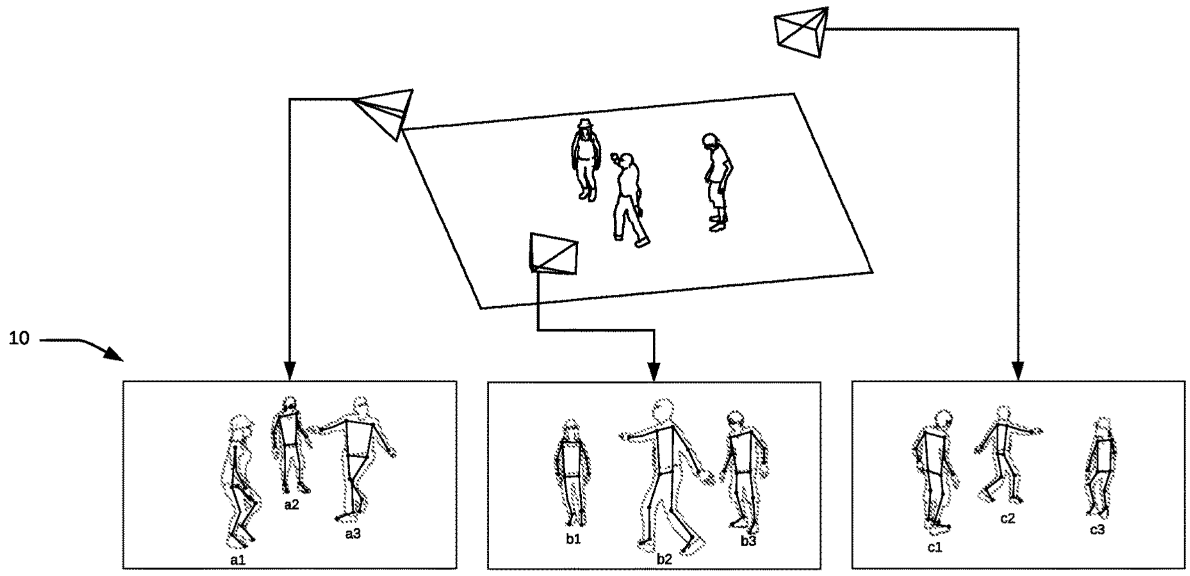
FIG. 1 is an exemplary pictorial representation of 2D skeleton data derived from three video sequences, in accordance with an embodiment.

With reference to FIG. 1, 2D skeleton data 10 is extracted from two or more video sequences, taken from calibrated cameras. To perform 3D reconstruction, the 2D skeletons may be matched across views. A calibrated camera is preferably a camera for which field of view, angle and location information is known. The two or more video sequences are preferably synchronized so that each of the video sequences include the same period of time and include at least some of the same humans/skeletons. In some instances, one or more humans/skeletons may leave the field of view of one or more of the cameras.

A 2D human pose estimator may generate 2D skeletons for each human in each of the two or more video sequences. This may be done using known techniques, such as using a convolutional neural network (CNN), including such as by Wrnch.AI. A sequence of 2D skeletons may be provided corresponding to the video sequences for each camera.

Figure 2:
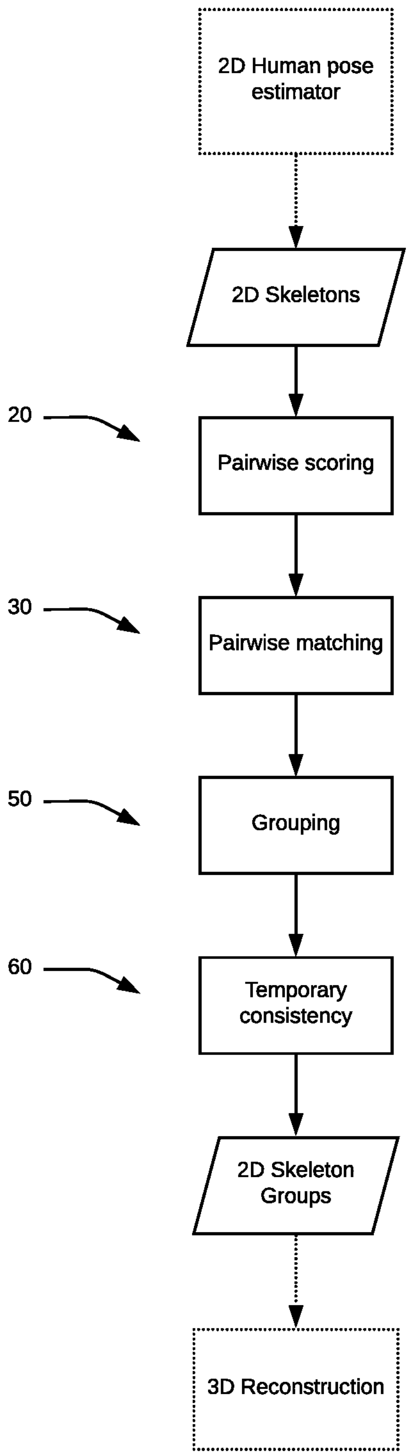
FIG. 2 is a block diagram of a system for matching 2D human poses, in accordance with an embodiment.

With reference to FIG. 2, the 2D matching system may comprise the following modules: the pairwise scoring module 20, the pairwise matching module 30, the grouping module 40, and the temporal consistency module 50. The pairwise-score module 20 may assign an affinity score to each possible combination of cross-view pairs of 2D skeletons. A cross-view pair of 2D skeleton is any pair of skeletons where one skeleton is from a first video sequence and the second is from a second video sequence. The affinity score of a given pair of 2D skeletons correlates to the likelihood that the pair belong to the same person. In a preferred embodiment, the affinity score may be a weighted sum of several metrics based on the concept of "approximate triangulations" of cross-view keypoint pairs, as described below.

An approximate triangulation is computed by projecting a ray through each of the two keypoints. A keypoint of a 2D skeleton may be one particular element such as the centre of the head, centre of the pelvis, right or left wrist. Assuming a pinhole camera model, each ray is modelled as originating at the respective camera's optical center, based on the parameters known of the camera such as its location, angle and field of view, and proceeding in the direction that passes through the keypoint on the virtual image plane. This is done for the same keypoint, for example the centre of the head, for the two skeletons being compared, one arising from a first camera and video sequence and one arising from the second camera and video sequence. The triangulation point is the point in 3-space with a minimum Euclidean distance between the two rays. The triangulation error may be the minimum distance between the two rays. If the triangulation point is determined to be behind the cameras, the rays are diverging and this point may not be considered in the score calculations. In some embodiments, this may be done for more than one keypoint pairs.

One affinity score metric may be the total count of "inlier" keypoint pairs for the set of approximate triangulations for the given pair of 2D skeletons, where in inlier pair may be defined as a keypoint pair with a triangulation error below a certain threshold. For instance, a pair of 2D skeletons {A, B} may have a total of 7 inlier pairs out of a possible 8 (the pair corresponding to the left wrist joint is not considered an inlier because of high triangulation error), and another pair of skeletons {A, C} may have a total of 6 inlier pairs out of a possible 8 (the pairs corresponding to the right ankle and head joints respectively are not considered inliers). In this instance, {A, B} may score higher on the inlier metric of the weighted affinity score than {A, C}. Another metric may be the average triangulation error of all the pairs of keypoints belongs to the two skeletons. Another metric may be the "human-ness" of a putative 3D skeleton reconstruction consisting of all inlier triangulation points. The human-ness metric may be inversely proportional to the deviation of the limb lengths of the putative skeleton from those of an average person, based on anthropometric data. For instance, a putative 3D skeleton derived from a mismatched pair of 2D skeletons may have limbs that may be double the length of an average person, and thus may have a lower human-ness metric than a pair of correctly matched skeletons.

Figure 3:
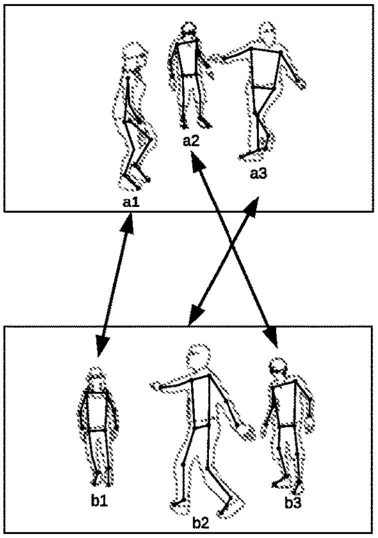
FIG. 3 is an exemplary table of affinity scores for a pair of views, and the matching pairs produced by the pairwise matching module, in accordance with an embodiment.

With reference to FIG. 3, the pairwise-matching module 30 may examine in turn all the cross-view affinity scores 60. In other words, the affinity score for each pair of skeletons, a first skeleton from a first camera and a second skeleton from a second camera. The module may find a set of one-to-one matches between the 2D skeletons in the two views that maximizes the affinity score 70. This may be solved by using an assignment method such as the Hungarian algorithm, the primal simplex algorithm, or the auction algorithm. To handle the case where no matches are made (for instance, when the two views capture disjoint sets of persons), an embodiment may suppress matches whose affinity scores fall below a threshold. This process may be repeated for all pairs of camera views.

Figure 4:
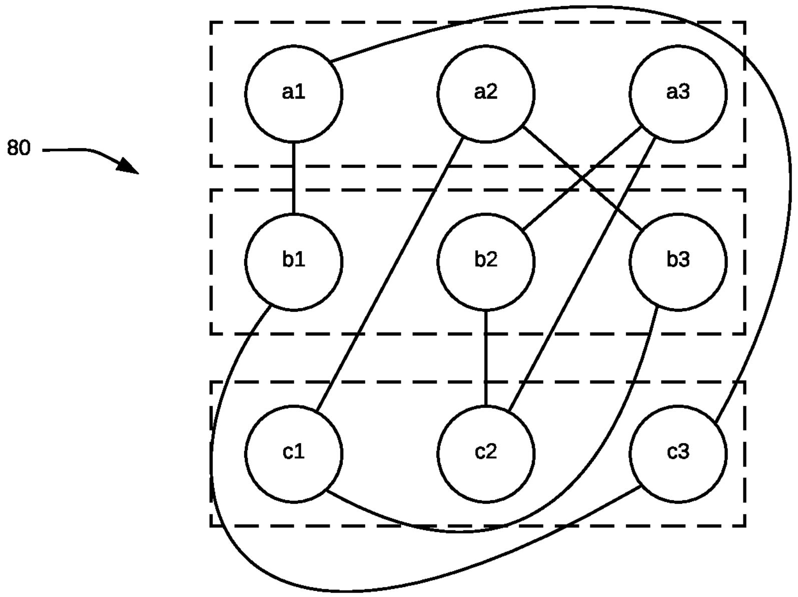
FIG. 4 is an exemplary graph of pairwise matches, and the connected components or cycles that represent groups that each correspond to a unique person.
Figure 4:
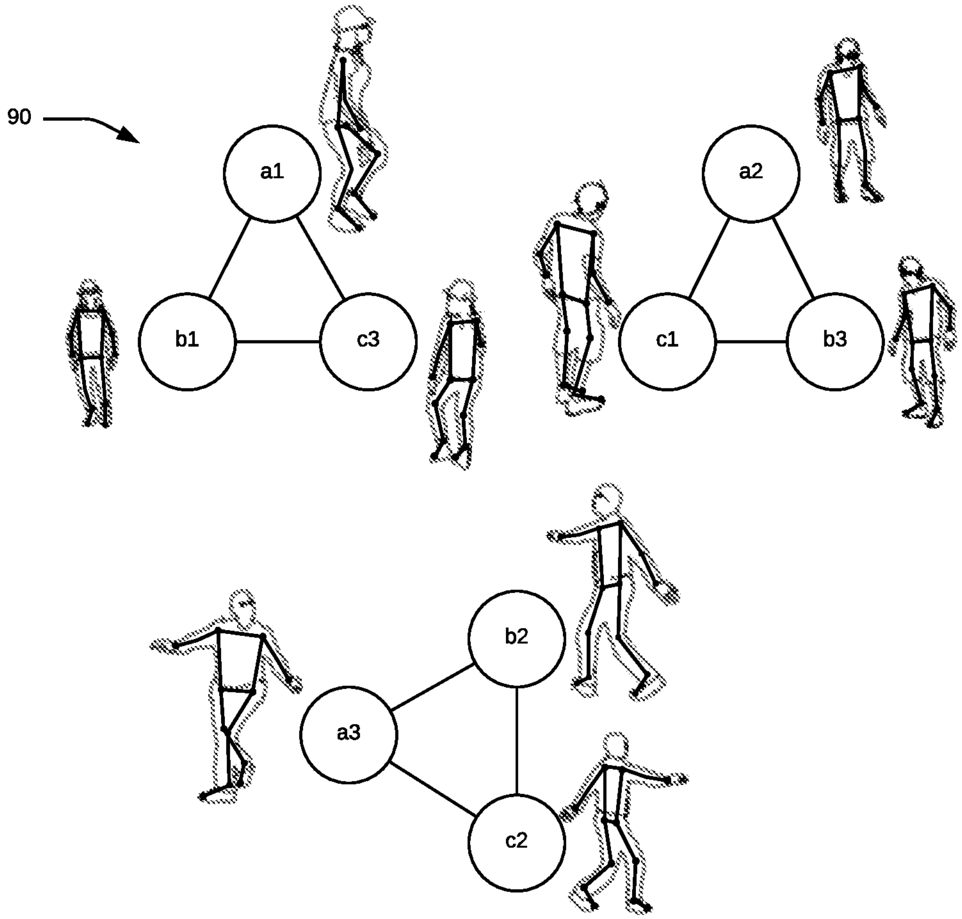

The grouping module 50 may take the set of pairwise matches and outputs N sets of 2D skeletons, where N is the number of distinct people in the scene and each set corresponds to a distinct person in the scene. With reference to FIG. 4, the procedure for this grouping may be as follows. An undirected graph 80 may be first constructed where each 2D skeleton is associated with a vertex, and each pairwise match is an edge. Next, the graph is partitioned into subgraphs 90 such that each subgraph's vertices comprise 2D skeletons that belong to the same person. The subgraphs may be connected components or biconnected components, and these subgraphs may be extracted using a standard depth-first search method.

The temporal matching module 60 may assign an ID to each 2D skeleton group, such that each person's ID remains consistent over the video sequences. An embodiment may achieve this by reprojecting the 3D skeletons from a previous timestep according to the camera parameters to create a set of predicted 2D skeletons in a current timestep. The pixel distance to each 2D skeleton group from the 2D skeleton projections of the previous timestep may be computed, and a matching method such as Hungarian algorithm is used to generate a one-to-one correspondence between the set of extant 3D skeletons and the 2D skeleton groups such that the pixel distances are minimized. The 2D groups may then be assigned IDs that correspond to the indices of the extant 3D skeletons. This may be continued for each timestep of the video sequence.

The system modules described may be separate software modules, separate hardware modules, or portions or one or more hardware components. The functionality of the modules described above may be implemented in a single system or provided in separate modules similar to or different from the modules described.

The software modules may consist of instructions written in a computer language such as C++ or assembly code and run on computer hardware such as a CPU, or they may be implemented on an FPGA. The software may utilize storage, such as RAM or magnetic storage, such as one or more hard drives. The system may run on a desktop computer, mobile phone or another platform that includes suitable memory for holding the software, data and skeletons parameters.

In an embodiment, the human matching system may comprise part of a motion capture system which digitizes the 3D poses of two or more humans subjects, such as in real time or post processing. This digitized pose data may be used for such applications as performance capture for digital media, or for sport analytics. Two or more calibrated cameras may be synchronized and their video streams captured and processed by 2D pose estimator systems, such as one for each video stream. The matching system may receive the output 2D skeletons from the 2D pose estimators, such as through a network interface or computer bus. The matched 2D skeleton groups may then be provided to a 3D reconstruction module, which fuses the 2D keypoints for each person in the scene to obtain the 3D pose data for each skeleton.

Various embodiments of the present disclosure having been thus described in detail by way of example, it will be apparent to those skilled in the art that variations and modifications may be made without departing from the disclosure. The disclosure includes all such variations and modifications as fall within the scope of the appended claims.

The invention claimed is:

1. A method of identifying humans across first and second views corresponding to different cameras, the method comprising:

creating multiple three-dimensional skeletons, each of which is created by combining one of multiple skeletons in the first view with a different one of multiple skeletons in the second view;

for each of the multiple skeletons in the first view, performing a pairwise scoring with each of the multiple skeletons in the second view by determining a deviation of an attribute of a corresponding one of the multiple three-dimensional skeletons from an average human, determined based on anthropometric data, so as to produce multiple affinity scores, wherein each affinity score is associated with a corresponding one of the multiple skeletons in the second view;

identifying a matching skeleton from among the multiple skeletons in the second view based on the affinity scores;

forming multiple skeleton sets by assigning each of the multiple skeletons in the first view and the matching skeleton identified in the second view to a different grouping that corresponds to a unique one of the humans; and for each of the multiple skeleton sets, combining skeletons assigned to a same grouping across a sequence of frames corresponding to the first and second views, so as to create a second three-dimensional skeleton that represents spatial position of the corresponding human.

2. The method of claim 1, further comprising:

for each of the multiple skeleton sets, associating an identifier therewith that uniquely identifies that skeleton set among the multiple skeleton sets, and assigning the identifier to each skeleton in that skeleton set across the sequence of frames corresponding to the first and second views.

3. The method of claim 1, wherein each affinity score is representative of a likelihood that a corresponding pair of skeletons belong to the same one of the humans, and wherein the likelihood is determined via a weighted sum of multiple metrics based on cross-view keypoint pairs.

4. The method of claim 1, wherein said performing comprises:

modeling a ray from the first view to an element of that skeleton in the first view, modeling multiple rays from the second view to the element of each of the multiple skeletons in the second view, and determining distances between the ray and each of the multiple rays.

5. The method of claim 4, wherein the matching skeleton is identified by selecting whichever of the multiple rays corresponds to the lowest distance.

6. The method of claim 4, wherein said performing further comprising:

excluding skeletons in the second view, if any, for which distance exceeds a threshold as candidate matches for that skeleton in the first view.

7. A non-transitory medium with instructions stored thereon that, when executed by a processor, cause the processor to perform operations comprising:

obtaining (i) a first video stream that comprises a first series of frames and is generated by a first camera and (ii) a second video stream that comprises a second series of frames and is generated by a second camera, wherein the first and second video streams are synchronized, such that each frame in the first series of frames is associated with a corresponding frame in the second series of frames;

generating (i) first skeletons for humans that are viewable in the first video stream and (ii) second skeletons for humans that are viewable in the in the second video stream;

forming matches between the first and second skeletons, such that each of the first skeletons is matched with one of the second skeletons in the corresponding frame, wherein said forming involves (i) creating multiple three-dimensional skeletons, each of which is created by combining one of the first skeletons with a different one of the second skeletons, (ii) determining, for each of the multiple three-dimensional skeletons, a measure that quantifies deviation of an attribute of that three-dimensional skeleton from an average human, determined based on anthropometric data, so as to determine multiple measures, and (iii) identifying, for each of the first skeletons, a matching one of the second skeletons based on the multiple measures; and calibrating the first and second cameras by determining a position and an angle of the first camera and/or a position and an angle of the second camera.

8. The non-transitory medium of claim 7, wherein the operations further comprise:

identifying (i) a first set of skeletons across the first series of frames that correspond to a given human and (ii) a second set of skeletons across the second series of frames that correspond to the given human.

9. The non-transitory medium of claim 8, wherein the operations further comprise:

assigning an identifier to the first and second sets of skeletons, so as to consistently identify the given human across the first and second series of frames.

10. The non-transitory medium of claim 9, wherein the identifier uniquely identifies the given human among humans that are viewable in the first and second video streams.

11. The non-transitory medium of claim 7, wherein the operations further comprise:

synchronizing the first and second video streams by aligning frames taken at the same time by the first and second cameras.

12. A method of identifying humans across first and second views corresponding to different cameras, the method comprising:

for each of multiple skeletons in the first view that corresponds to a first camera, performing a pairwise comparison with each of multiple skeletons in the second view that corresponds to a second camera by computing an approximate triangulation by modeling a projection of a ray from the first and second cameras through an element of each pair of skeletons being compared;

identifying, based on the pairwise comparison, a matching skeleton from among the multiple skeletons in the second view, so as to identify multiple matching pairs of skeletons;

acquiring multiple three-dimensional skeletons, each of which is associated with a different one of the multiple matching pairs of skeletons;

forming multiple skeleton sets by— determining, for each of the multiple matching pairs of skeletons, a measure that quantifies deviation of an attribute of a corresponding one of the multiple three-dimensional skeletons from an average human, determined based on anthropometric data, so as to determine multiple measures, identifying, based on the multiple measures, a matching one of the multiple skeletons in the second view for each of the multiple skeletons in the first view, and assigning each of the multiple skeletons in the first view and the matching skeleton identified in the second view to a different grouping that corresponds to a unique one of the humans; and for each of the multiple skeleton sets, assigning an identifier to each skeleton in that skeleton set across a sequence of frames corresponding to the first and second views.

13. The method of claim 12, wherein each identifier uniquely identifies the corresponding skeleton set among the multiple skeleton sets.

14. The method of claim 12, further comprising:

for each of the multiple skeleton sets, combining skeletons to which the identifier is assigned across the sequence of frames, so as to create a three-dimensional skeleton that represents spatial position of the corresponding human.

15. The method of claim 12, wherein the matching one of the multiple skeletons in the second view that is identified corresponds to a lowest measure, indicating the least deviation of the attribute of the three-dimensional skeleton from the average human.

16. The method of claim 12, wherein the element is a head, a pelvis, a left wrist, or a right wrist.

17. A method for identifying humans across first and second views corresponding to different cameras, the method comprising:

for each of multiple skeletons in the first view, identifying a matching skeleton from among multiple skeletons in the second view, so as to identify multiple matching pairs of skeletons;

acquiring multiple three-dimensional skeletons, each of which is associated with a different one of the multiple matching pairs of skeletons;

forming multiple skeleton sets by— determining, for each of the multiple matching pairs of skeletons, a measure that quantifies deviation of an attribute of a corresponding one of the multiple three-dimensional skeletons from an average human, determined based on anthropometric data, so as to determine multiple measures, identifying, based on the multiple measures, a matching one of the multiple skeletons in the second view for each of the multiple skeletons in the first view, and assigning each of the multiple skeletons in the first view and the matching skeleton identified in the second view to a different grouping that corresponds to a unique one of the humans; and for each of the multiple skeleton sets, assigning an identifier to each skeleton in that skeleton set across a sequence of frames corresponding to the first and second views; and combining skeletons to which the identifier is assigned across the sequence of frames, so as to create a three-dimensional skeleton that represents spatial position of the corresponding human.

* * * * *